United States Patent
Kojima et al.

(10) Patent No.: US 8,348,304 B2
(45) Date of Patent: Jan. 8, 2013

(54) AIRBAG JACKET ACTIVATING SYSTEM

(75) Inventors: Hiroyuki Kojima, Saitama (JP); Sumitaka Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 13/052,189

(22) Filed: Mar. 21, 2011

(65) Prior Publication Data

US 2011/0237194 A1    Sep. 29, 2011

(30) Foreign Application Priority Data

Mar. 24, 2010  (JP) .................................. 2010-068653

(51) Int. Cl.
*B60R 21/16* (2006.01)

(52) U.S. Cl. ....................................................... 280/735

(58) Field of Classification Search .................. 280/735, 280/730.1; 455/41.3, 42

See application file for complete search history.

(56) References Cited

U.S. PATENT DOCUMENTS

| | | | | |
|---|---|---|---|---|
| 7,543,846 B2* | 6/2009 | Makabe et al. | ............. | 280/730.1 |
| 7,774,867 B2* | 8/2010 | Orita et al. | .......................... | 2/456 |
| 7,849,519 B2* | 12/2010 | Goto | .................................... | 2/96 |
| 7,997,613 B2* | 8/2011 | Kobayashi et al. | ............ | 280/735 |
| 2002/0047252 A1* | 4/2002 | Kim | ............................. | 280/728.1 |
| 2009/0055053 A1* | 2/2009 | Carmeli | ............................ | 701/45 |
| 2009/0127835 A1* | 5/2009 | Lin | ............................. | 280/730.1 |
| 2011/0233906 A1* | 9/2011 | Ogawa et al. | .................. | 280/735 |

FOREIGN PATENT DOCUMENTS

JP         2006-22606 A         1/2006

* cited by examiner

*Primary Examiner* — Faye M. Fleming
(74) *Attorney, Agent, or Firm* — Birch, Stewart, Kolasch & Birch, LLP

(57) ABSTRACT

An airbag jacket activating system includes radio communications transceivers configured to make RF communications and LF communications, respectively. An acceleration sensor configured to detect acceleration of a motorcycle. An update unit configured to update an LF communications ID, to code the updated LF communications ID together with an RF communications ID, and to transmit the coded updated LF communications ID and the coded RF communications ID to an airbag jacket through RF communications. An update unit configured to store the updated LF communications ID in a case where the LF communications ID is received together with the RF communication ID. A control unit configured to cause the coded RF communications ID and an ignition signal to be transmitted through the RF communications, and to cause the LF communications ID and the ignition signal to be transmitted through the LF communications when the acceleration exceeds a predetermined value.

20 Claims, 10 Drawing Sheets

AIRBAG JACKET ACTIVATING SYSTEM

CROSS-REFERENCE TO RELATED APPLICATIONS

The present application claims priority under 35 USC 119 to Japanese Patent Application No. 2010-068653 filed on Mar. 24, 2010 the entire contents of which are hereby incorporated by reference.

BACKGROUND OF THE INVENTION

1. Field of the Invention

The present invention relates to an airbag jacket activating system. More specifically, the present invention relates to an airbag jacket activating system configured to make radio communications with a vehicle.

2. Description of Background Art

Keyless entry systems configured to carry out locking and unlocking operations through radio communications with a portable transceiver have been heretofore used for vehicles such as automobiles and motorcycles. For example, Japanese Patent Application Publication No. 2006-22606 discloses a keyless entry system in which a low-frequency (LF) request signal is transmitted from a vehicle to a portable transceiver and once the portable transceiver verifies this request signal, the portable transceiver transmits a high-frequency (RF) response signal to the vehicle.

An apparatus configured to make radio communications with a vehicle such as a keyless entry system may include an airbag jacket. The airbag jacket is an apparatus configured to reduce the influence of a large external force on a rider by deploying an airbag when the large external force is applied to the vehicle. It is conceivable that the above-mentioned multiple frequency bands may be applied to the system configured to activate this airbag jacket.

In this respect, the LF band makes it difficult to transmit data through coding the data because: the modulation amount is small and the quantity of data transmittable per unit time length is accordingly small. On the other hand, the RF band makes it easy to code data because the modulation amount is large and the quality of data transmittable per unit time length is accordingly large. Nevertheless, the RF band is likely to deteriorate the quality of the radio communications, for example, in a strong electric field area near a broadcasting station.

For this reason, when an ignition signal for the airbag and an ID signal are transmitted from the vehicle to the airbag jacket by use of the LF band, the uncoded ID is likely to be read by a third party. On the other hand, when the ignition signal and the ID signal are transmitted from the vehicle to the airbag jacket by use of the RF band, the signals are likely to be received improperly due to the deterioration in the quality of the radio communications.

SUMMARY AND OBJECTS OF THE INVENTION

An object of an embodiment of the present invention is to provide an airbag jacket activating system capable of securing the confidentiality of the signals and activating an airbag jacket with precision.

A first aspect of an embodiment of the present invention provides an airbag jacket activating system including radio communications means configured to make radio communications between a vehicle and an airbag jacket; acceleration detecting means configured to detect acceleration of the vehicle; on-vehicle control means configured to transmit deployment instruction data on the airbag jacket to the airbag jacket through the radio communications means in a case were the acceleration detected by the acceleration detecting means exceeds a predetermined value; and in-jacket control means configured to deploy the airbag jacket when receiving the deployment instruction data transmitted from the on-vehicle control means. The radio communications means includes high-frequency radio communications means configured to make radio communications by use of a high-frequency band and low-frequency radio communications means configured to make radio communications by use of a low-frequency band. The vehicle further includes on-vehicle storage means configured to store a high-frequency ID and a low-frequency ID and on-vehicle update means configured to update the low-frequency ID at a predetermined timing, to code the updated low-frequency ID together with the high-frequency ID, and to transmit the coded updated low-frequency ID and the coded high-frequency ID to the airbag jacket through the high-frequency radio communications means. The airbag jacket further includes in-jacket storage means configured to store the high-frequency ID and the low-frequency ID and in-jacket update means configured to collate the high-frequency ID transmitted from the on-vehicle update means with the high-frequency ID stored in the in-jacket storage means, and to store the updated low-frequency ID in the in-jacket storage means when receiving the updated low-frequency ID together with the high-frequency ID whose collation succeeds. When the acceleration detected by the acceleration detecting means exceeds a predetermined value, the on-vehicle control means causes the coded high-frequency ID and the deployment instruction data to be transmitted through the high-frequency radio communications means, and causes the low-frequency ID and the deployment instruction data to be transmitted through the low-frequency radio communications means. The in-jacket control means receives the deployment instruction data which is transmitted together with any one of the high-frequency ID and the low-frequency ID, and thus deploys the airbag jacket.

According to an embodiment of the present invention, the in-jacket control means collates the high-frequency ID with the high-frequency ID stored in the in-jacket storage means preferentially over the low-frequency ID, and the in-jacket control means deploys the airbag jacket before collating the low-frequency IDs, when succeeding in the collation of the high-frequency IDs and receiving the deployment instruction data.

According to an embodiment of the present invention, the on-vehicle update means generates the low-frequency ID by use of part of the high-frequency ID.

According to an embodiment of the present invention, the on-vehicle update means generates the low-frequency ID by adding a random number to the part of the high-frequency ID.

According to an embodiment of the present invention, the on-vehicle control means transmits a single piece of data through the high-frequency radio communications means by use of a plurality of frequencies in the high-frequency band, and the in-jacket control means deploys the airbag jacket when succeeding in the collation of the high-frequency ID at a predetermined or higher rate over the plurality of frequencies and receiving the deployment instruction data.

According to an embodiment of the present invention, the high-frequency radio communications means and the low-frequency radio communications means transmit and receive a control signal for locking or unlocking the vehicle.

According to an embodiment of the present invention, the airbag jacket activating system uses both the high-frequency band and the low-frequency band. In other words, the vehicle is capable of transmitting the low-frequency ID and ignition signals to the airbag jacket by use of the low-frequency band, even in a case where the reliability of the radio communications using the high-frequency band, which enables the high-frequency ID to be coded, deteriorates. This low-frequency ID is updated at a predetermined timing. For this reason, it is possible to inhibit the low-frequency ID from being decoded by the third party. Accordingly, no matter whether the airbag jacket activating system uses the high-frequency band or the low-frequency band, the airbag jacket activating system is capable of securing the confidentiality of the ID signal, and of activating the airbag jacket with precision.

According to an embodiment of the present invention, the airbag jacket activating system gives priority to the radio communications using the high-frequency band, which enables the encode and makes verification accuracy higher, over the radio communications using the low-frequency band. For this reason, the airbag jacket activating system is capable of enhancing the process efficiency while maintaining the operation accuracy.

According to an embodiment of the present invention, the airbag jacket activating system is capable of easily generating the low-frequency ID by use of the high-frequency ID According to an embodiment of the present invention, the airbag jacket activating system is capable of easily generating the low-frequency ID by use of the high-frequency ID, and of enhancing the confidentiality by adding the random number.

According to an embodiment of the present invention, the airbag jacket is configured to be deployed when receiving the correct ID and the deployment instruction data at a predetermined or higher rate (for example, the majority of) over the multiple frequencies. Accordingly, the airbag jacket activating system is capable of reducing the influence of noise, and of enhancing the reliability of the operational judgment on whether or not the airbag jacket system should deploy the airbag jacket.

According to an embodiment of the present invention, the airbag jacket activating system is capable of sharing the radio communications means with a smart-key (keyless entry) system configured to transmit and receive the control signals for locking and unlocking the vehicle. For this reason, the airbag jacket activating system can be realized without providing any new specialized member to the existing system, and cost reduction can be accordingly achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, descriptions will be provided for a first embodiment of the present invention on the basis of the drawings.

Figure 1:
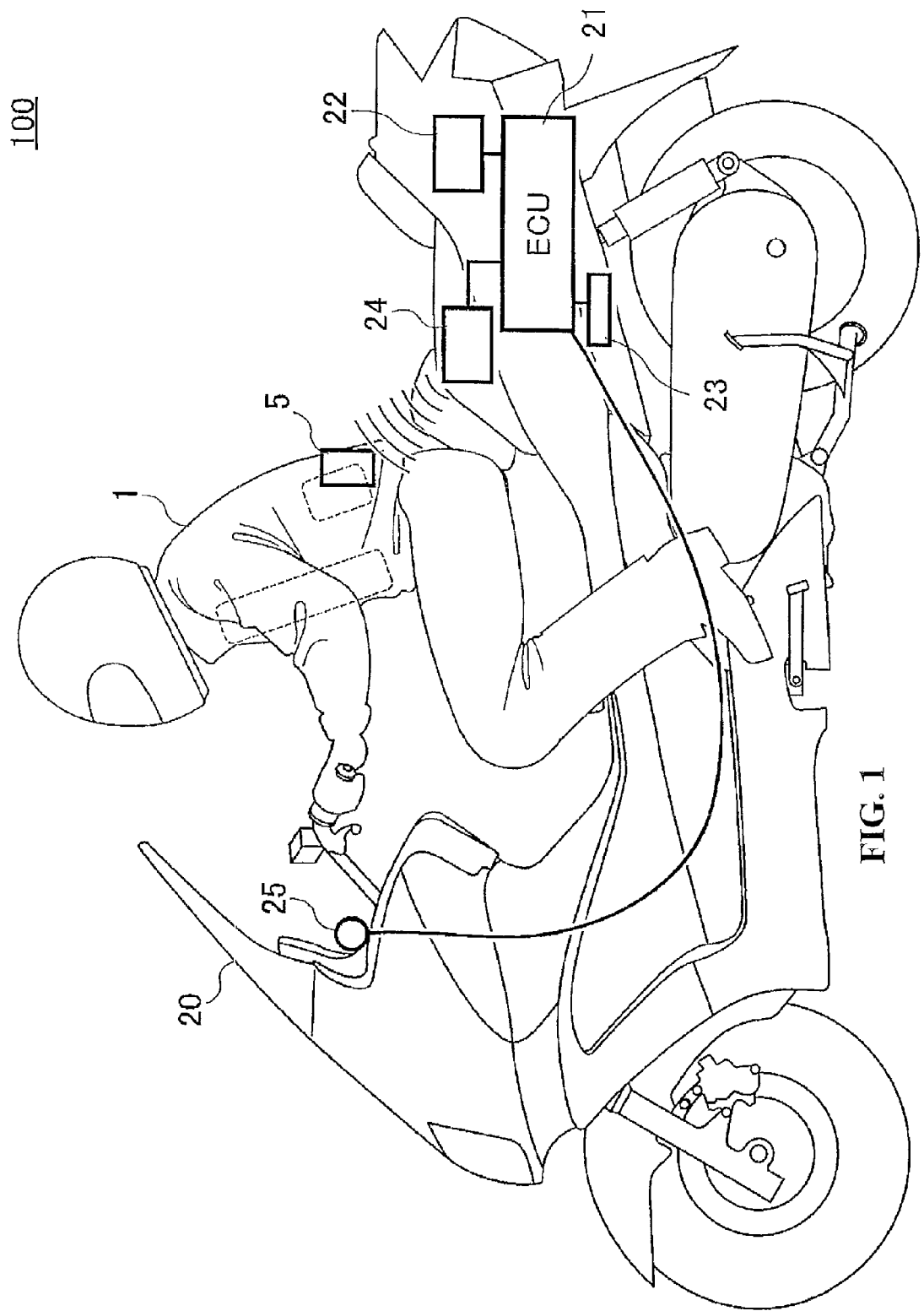
FIG. 1 is a schematic diagram showing a configuration of an airbag jacket activating system according to a first embodiment.

FIG. 1 is a schematic diagram showing a configuration of an airbag jacket activating system 100 according to the first embodiment.

The airbag jacket activating system 100 includes a motorcycle 20 as a vehicle and an airbag jacket 1 which a rider of the motorcycle 20 wears.

The motorcycle 20 includes an ECU (Electronic Control Unit) 21 as a control unit; a battery 22 configured to supply electric power; an acceleration sensor 23 (acceleration detecting means) configured to detect an acceleration of the motorcycle 20; a radio transceiver 24 configured to make radio communications with the airbag jacket 1 and an indicator 25. In addition, the battery 22, the acceleration sensor 23 and the radio transceiver 24 are connected to the ECU 21. Note that, as described later, the radio transceiver 24 includes an RF transceiver 24a configured to make radio communications with the airbag jacket 1 by use of an RF band (a high-frequency band, for example, a 2.4-GHz band in accordance with the Bluetooth standards) and an LF transceiver 24b configured to make radio communications with the airbag jacket 1 by use of an LF band (a low-frequency band, for example, a 133.3-KHz band).

Figure 2:
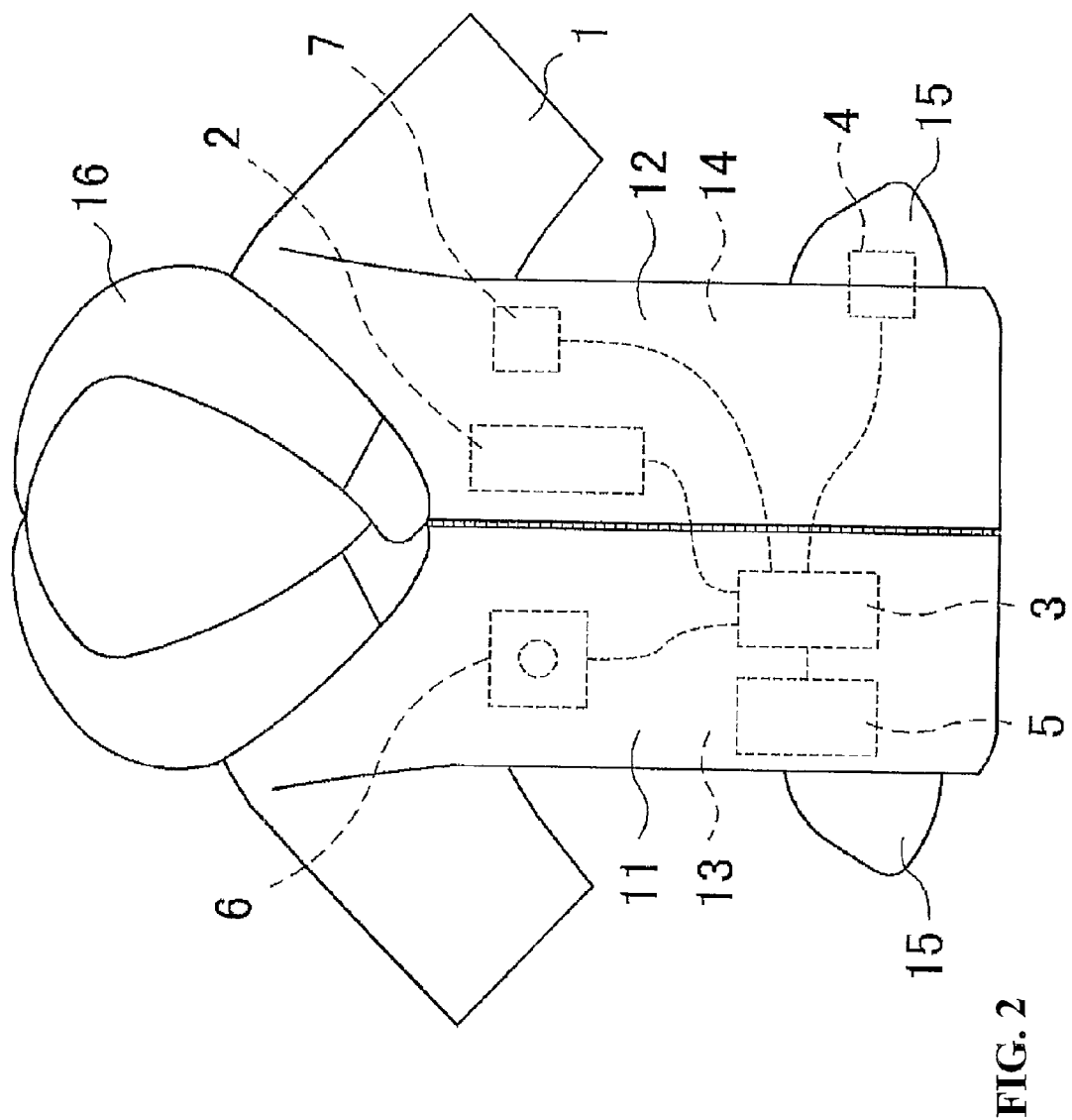
FIG. 2 is a diagram showing a configuration of an airbag jacket according to the first embodiment.

Furthermore, FIG. 2 shows a configuration of the airbag jacket 1.

The airbag jacket 1 includes an inflation air chamber which is divided into a right front part 11, a left front part 12, a right rear part 13, a left rear part 14, a waist part 15 and a collar part 16.

The airbag jacket 1 further includes an inflator 2 configured to supply the air to each part of the inflation air chamber when the airbag is deployed; an ECU 3 configured to control the inflator 2 and radio communications; a battery 4 configured to supply electric power to the ECU 3; a radio transceiver 5 configured to make radio communications with the motorcycle 20; a main switch 6 and an alarm unit 7. In addition, the inflator 2, the battery 4, the radio transceiver 5, the main switch 6 and the alarm unit 7 are connected to the ECU 3. Note that, as described later, the radio transceiver 5 includes an RF transceiver 5a (a high-frequency radio communications means) configured to make radio communications by use of the RF band; and an LF transceiver 5b (a low-frequency radio communications means) configured to make radio communications by use of the LF band.

In this respect, the inflator 2 is formed from a carbon dioxide gas container and an activation device configured to break a seal of the carbon dioxide gas container. In addition, the alarm unit 7 is a buzzer or vibrator configured to issue a notice about an abnormality in each part attached to the airbag jacket 1 and an abnormality in the action of the rider. The alarm unit 7 may further issue a notice about a deployment operation of the airbag.

Note that all the above-mentioned parts provided to the airbag jacket 1 can be fixed to the airbag jacket 1 by sewing them to the airbag jacket 1 or by containing them in their respective pocket-like containing portions With the above-described configuration, the ECU 21 configured to control the motorcycle 20 judges whether to activate the airbag jacket 1 which the rider wears, that is to say, whether or not the airbag should be deployed, on the basis of the acceleration detected by the acceleration sensor 23. Subsequently, the ECU 21 transmits an ignition signal for the airbag and an ID signal to the transceiver 5 of the airbag jacket 1 through the radio transceiver 24. Furthermore, the indicator 25 is a light-emitting part or a display part configured to inform the rider of the occurrence of an abnormality in any of the parts. For example, once an abnormality is detected in the airbag jacket 1, the ECU 21 receives a notice about the abnormality by radio, and informs the rider of the abnormality through the indicator 25.

Figure 3:
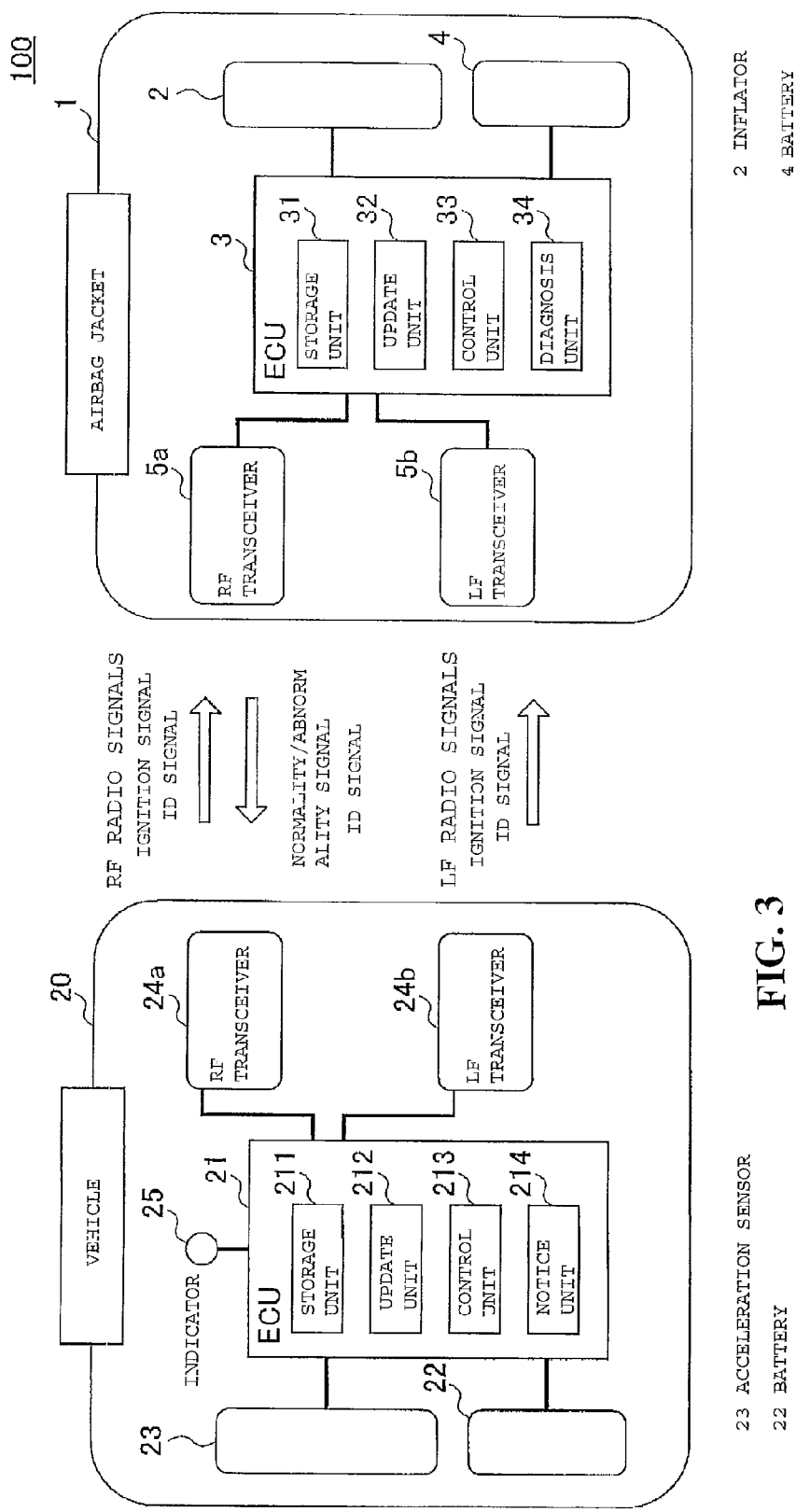
FIG. 3 is a block diagram showing a configuration of the airbag jacket activating system according to the first embodiment.

FIG. 3 is a block diagram showing a configuration of the airbag jacket activating system 100 according to the first embodiment.

In the airbag jacket activating system 100, the ECU 21 of the motorcycle includes a storage unit 211 (on-vehicle storage means), an update unit 212 (on-vehicle update means), a control unit 213 (on-vehicle control means), and a notice unit 214.

The storage unit 211 stores an RF communications ID (a high-frequency ID) and an LF communications ID (a low-frequency ID) for the purpose that an ID is shared with the airbag jacket 1 and the ID is mutually verified. In this respect, the RF communications ID is a fixed value, and is not changed. However, the LF communications ID is updated by the update unit 212 at a predetermined timing such as a timing of turning on the power supply or a timing of staring the engine.

Figure 4:
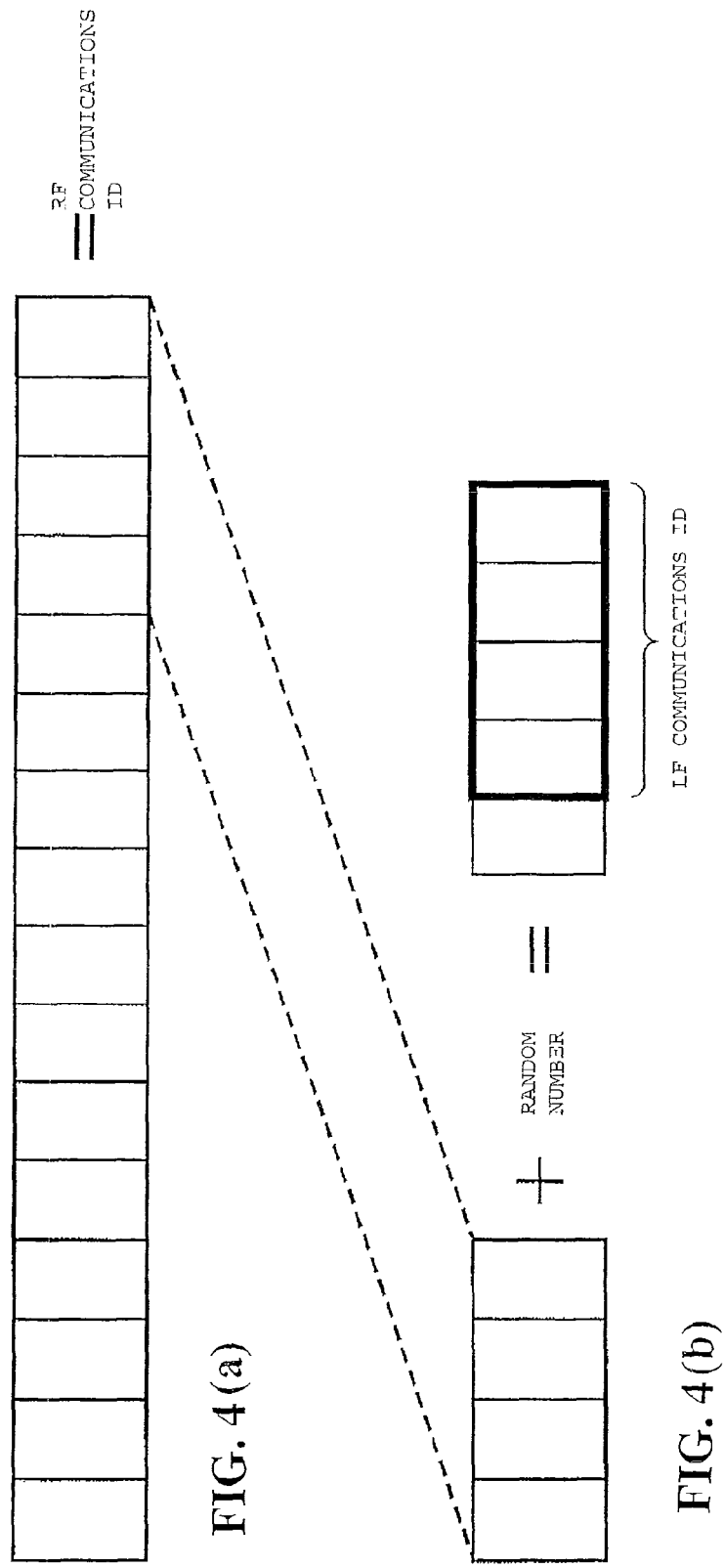
FIGS. 4(a) and 4(b) are diagrams showing an example of an RF communications ID and an example of an LF communications ID according to the first embodiment.

FIG. 4 is a diagram showing an example of the RF communications ID and an example of the LF communications ID according to this embodiment.

To put it more specifically, as shown in FIG. 4($a$), the RF communications ID may be a verification key (a passkey) in accordance with the Bluetooth standards. In this embodiment, the RF communications ID is data represented by 16 characters (8 bits×16=128 bits).

The update unit 212 generates the LF communications ID by use of part of the RF communications ID. More specifically, as shown in FIG. 4($b$), the update unit 212 adds a four-digit random number to the last four digits of the RF communications ID, and sets the last four digits of a number resulting from the calculation as the LF communications ID. Furthermore, the update unit 212 codes the updated LF communications ID and the RF communications ID, and transmits the thus-coded IDs to the airbag jacket 1 through the RF transceiver 24$a$.

Returning to FIG. 3, the control unit 213 judges that a predetermined or larger external force is applied, in a case where an acceleration detected by the acceleration sensor 23 exceeds a predetermined value. Subsequently, the control unit 213 codes the RF communications ID, and thereafter transmits this coded RF communications ID and the ignition signal as the deployment instruction data on the airbag jacket 1 to the airbag jacket 1 through the RF transceiver 24$a$. Furthermore, the control unit 213 transmits the LF communications ID and the ignition signal to the airbag jacket 1 through the LF transceiver 24$b$.

Moreover, once the notice unit 214 receives an abnormality signal and the RF communications ID from the airbag jacket 1 through the RF transceiver 24$a$, the notice unit 214 controls the indicator 25, and thereby informs the rider of the abnormality in the airbag jacket 1. In addition, the notice unit 214 may change notice methods of the indicator (a light emitting method such as lighting or flashing, characters to be displayed, and the like) depending on kinds of abnormality signals for indicating things such as a location and criticality of the trouble.

Next, in the airbag jacket activating system 100, the ECU 3 of the airbag jacket 1 includes a storage unit 31 (in-jacket storage means), an update unit 32 (in-jacket update means), a control unit 33 (in-jacket control means) and a diagnosis unit 34.

As in the case of the motorcycle 20, the storage unit 31 stores the RF communications ID and the LF communications ID. In this respect, the RF communications ID which is common with the motorcycle 20 is the fixed value, and is not changed. However, the LF communications ID is updated by the update unit 32 on the basis of the signal received from the motorcycle 20.

Once the update unit 32 receives the signal, which is transmitted by the update unit 212 of the motorcycle 20, through the RF transceiver 5$a$, the update unit 32 collates the RF communications ID, which is acquired by decoding this signal, with the ID which is stored in the storage unit 31. When succeeding in this collation, the update 32 updates the LF communications ID, which is stored in the storage unit 31, by use of the LF communications ID acquired together with the RF communications ID.

The control unit 33 controls the signal, which is transmitted by the control unit 213 of the motorcycle 20, through the RF transceiver 5$a$ or the LF transceiver 5$b$. First of all, the control unit 33 collates the RF communications ID, which is acquired by decoding the signal received by the RF transceiver 5$a$, with the ID which is stored in the storage unit 31. When succeeding in this collation and obtaining the ignition signal together with the RF communication ID, the control unit 33 deploys the airbag jacket 1 by activating the activation device of the inflator 2.

In addition, in a case where the collation of the RF communications ID fails, or in a case where no ignition signal is obtained, the control unit 33 collates the LF communications ID, which is received by the LF transceiver 5$b$, with the ID which is stored in the storage unit 31. When succeeding in this collation and obtaining the ignition signal together with the LF communications ID, the control unit 33 deploys the airbag jacket 1 by activating the activation device of the inflator 2.

The diagnosis unit 34 diagnoses trouble in the ECU 3, the inflator 2 and the like in the airbag jacket 1. To put it more specifically, the diagnosis unit 34 always monitors trouble (abnormalities) such as breakages and short-circuits in the electrical system, and detects the locations of such trouble (abnormalities). Thus, the diagnosis unit 34 transmits a normality signal to the motorcycle 20 through the RF transceiver 5$a$, in a case where the diagnosis unit 34 detects no locations of such trouble (abnormalities). In a case where the diagnosis unit 34 detects a location of such a trouble (abnormality), the diagnosis unit 34 transmits an abnormality signal, which indicates the location and the condition of the abnormality, to the motorcycle through the RF transceiver 5a.

Figure 5:
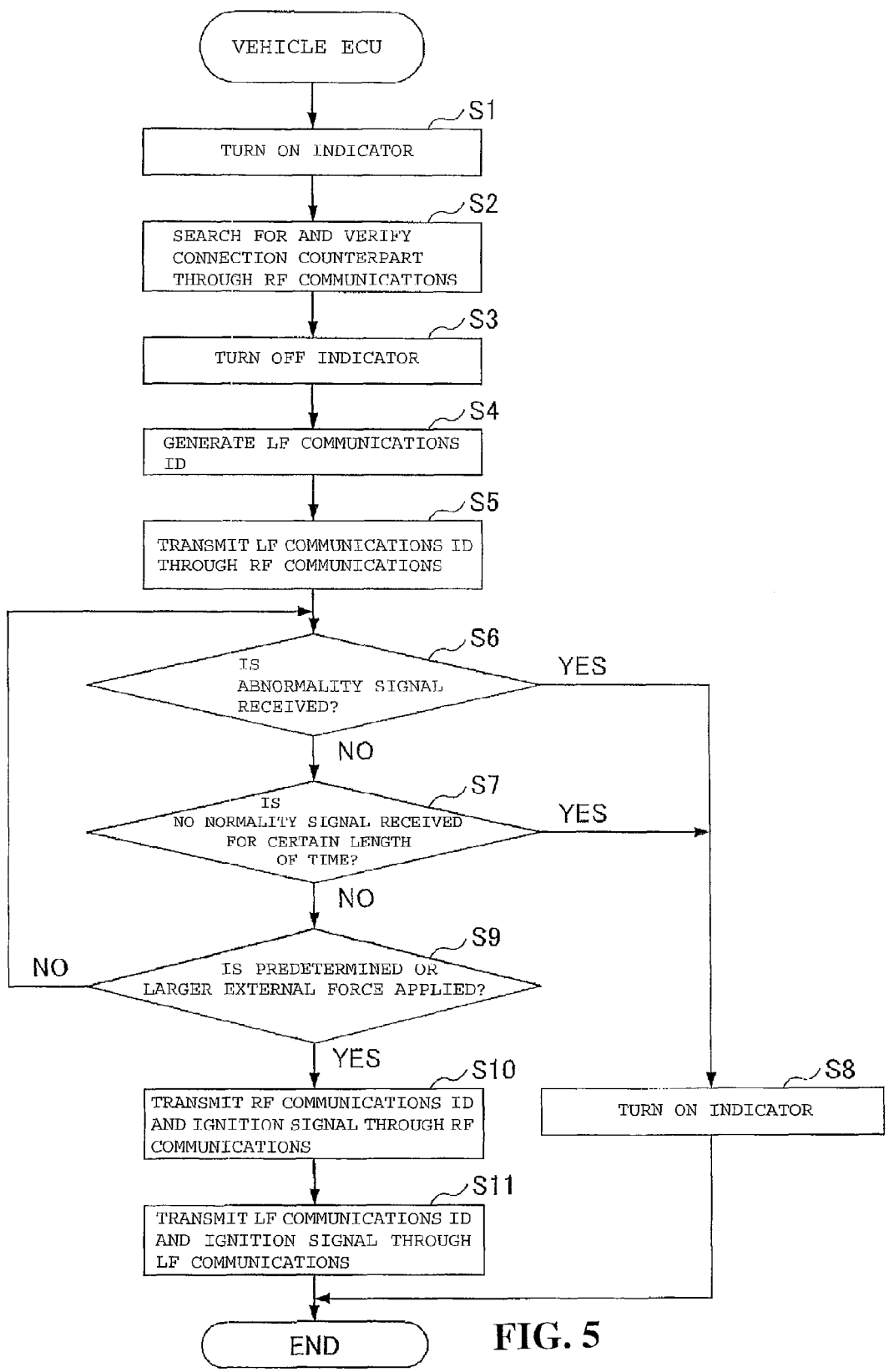
FIG. 5 is a flowchart showing a process of an ECU on a motorcycle according to the first embodiment.

FIG. 5 is a flowchart showing a process of the ECU 21 on the motorcycle according to this embodiment. This process begins once the rider of the motorcycle 20 turns on the electric power by use of the ignition key, or starts the engine. In addition, the timing of the beginning of the process is not limited to this, and may be set up whenever deemed necessary in response to timings of various operations by the rider.

In step S1, the ECU 21 turns on the indicator 25 in order to let the rider know that the indicator 25 is operating normally.

In step S2, the ECU 21 searches for and verifies the airbag jacket 1 as its connection counterpart through the RF communications of the RF transceiver 24a. The connection is automatically established between the motorcycle 20 and the airbag jacket 1 which beforehand share the RF communications ID (passkey).

In step S3, the ECU 21 turns off the indicator 25 in order to indicate that the airbag jacket activating system 100 is operating normally.

In step S4, the ECU 21 (the update unit 212) generates the LF communications ID on the basis of the RF communications ID stored in the storage unit 211.

In step S5, the ECU 21 (the update unit 212) transmits the LF communications ID, which is generated in step S4, to the airbag jacket 1 through the RF communications of the RF transceiver 24a.

In step S6, the ECU 21 (the notice unit 214) judges whether or not an abnormality signal is received from the airbag jacket 1 by the RF transceiver 24a. If this judgment is YES, the ECU 21 causes the process to proceed to step S8. If the judgment is NO, the ECU 21 causes the process to proceed to step S7.

In step S7, the ECU 21 (the notice unit 214) judges whether or not no normality signal is received for a certain or longer length of time. If the judgment is YES, the ECU 21 causes the process to proceed to step S8. If the judgment is NO, the ECU 21 causes the process to proceed to step S9.

In step S8, the ECU 21 (the notice unit 214) judges that the airbag jacket 1 is not operating normally, and informs the rider of the occurrence of the abnormality by turning on the indicator 25.

In step S9, the ECU 21 (the control unit 213) judges whether or not a predetermined or larger external force is applied on the basis of an acceleration detected by the acceleration sensor 23. If this judgment is YES, the ECU 21 causes the process to proceed to step S10. If the judgment is NO, the ECU 21 causes the process to return to step S6.

In step S10, the ECU 21 (the control unit 213) codes the RF communications ID and the ignition signal, and thereafter transmits them to the airbag jacket 1 through the RF communications of the RF transceiver 24a.

In step S11, the ECU 21 (the control unit 213) codes the LF communications ID and the ignition signal, and thereafter transmits them to the airbag jacket 1 through the LF communications of the LF transceiver 24b.

Figure 6:
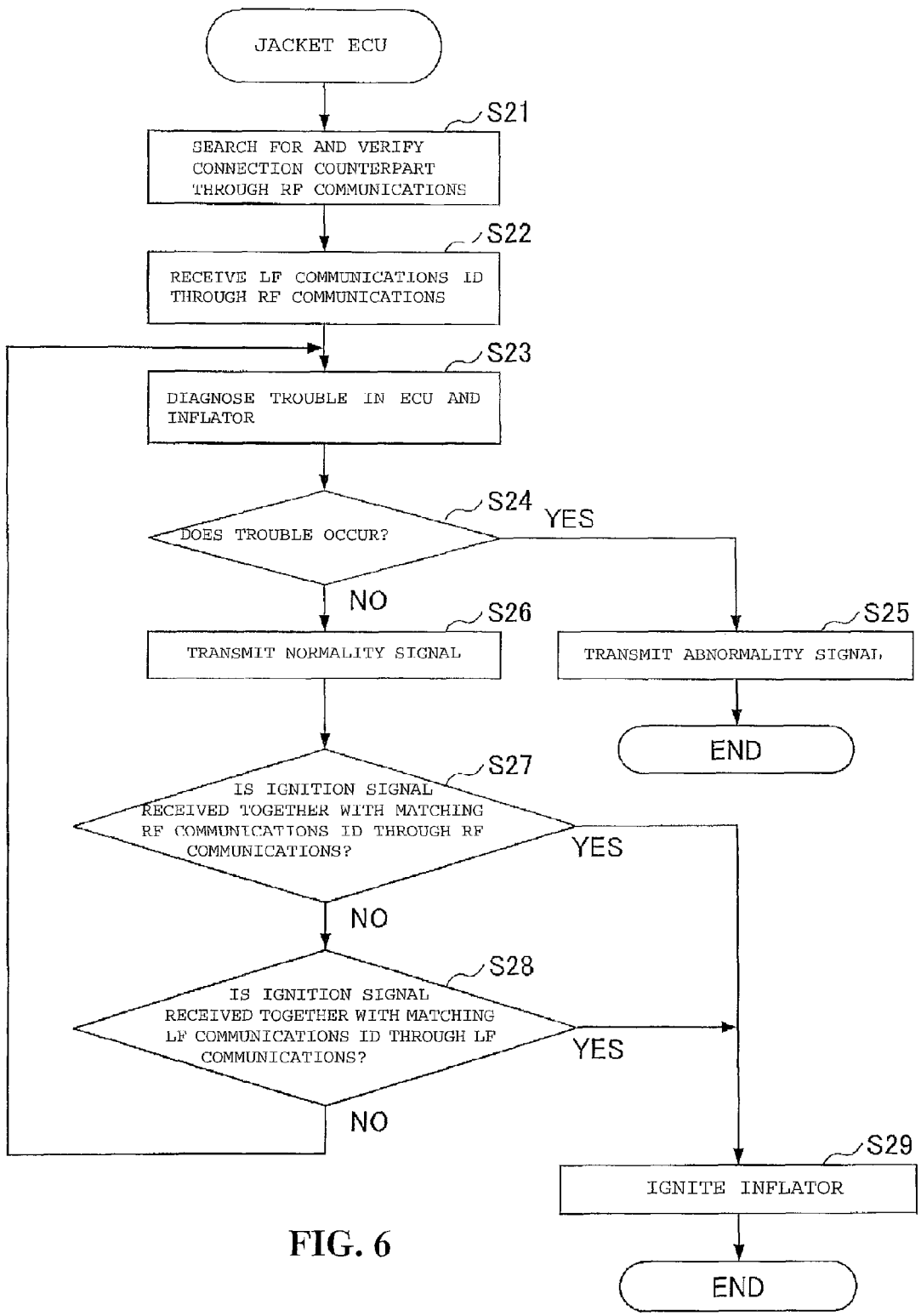
FIG. 6 is a flowchart showing a process of an ECU in an airbag jacket according to the first embodiment.

FIG. 6 is a flowchart showing a process of the ECU 3 in the airbag jacket 1 according to this embodiment.

In step S21, the ECU 3 searches for and verifies the motorcycle 20 as its connection counterpart through the RF communications of the RF transceiver 5a. The connection is automatically established between the motorcycle 20 and the airbag jacket 1 which beforehand share the RF communications ID (passkey).

In step S22, the ECU 3 (the update unit 32) receives the LF communications ID, which is transmitted in step S5 (in FIG. 5), through the RF communications of the RF transceiver 5a. Subsequently, once the ECU 3 succeeds in collating the RF communications ID, the ECU 3 stores the LF communications ID in the storage unit 31.

In step S23, the ECU 3 (the diagnosis unit 34) diagnoses troubles in the ECU 3, the inflator 2 and the like, as well as thus detecting the presence or absence of trouble (abnormalities) and the locations of such trouble (abnormalities).

In step S24, the ECU 3 (the diagnosis unit 34) judges the presence or absence of trouble (abnormalities) from the result of the diagnosis in step S23. If the judgment is YES, the ECU 3 causes the process to proceed to step S25. If the judgment is NO, the ECU 21 causes the process to proceed to step S26

In step S25, the ECU 3 (the diagnosis unit 34) transmits an abnormality signal to the motorcycle 20 through the RF communications of the RF transceiver 5a, because the ECU 3 judges that the trouble (abnormality) has occurred.

In step S26, the ECU 3 (the diagnosis unit 34) transmits a normality signal to the motorcycle 20 through the RF communications of the RF transceiver 5a, because the ECU 3 judges that no trouble (abnormality) has occurred.

In step S27, the ECU 3 (the control unit 33) judges whether or not the ignition signal is received together with the RF communications ID which matches the ID stored in the storage unit 31 through the RF communications of the RF transceiver 5a. If this judgment is YES, the ECU 3 causes the process to proceed to S29. If the judgment is NO, the ECU 3 causes the process to proceed to S28.

In step S28, the ECU 3 (the control unit 33) judges whether or not the ignition signal is received together with the LF communications ID which matches the ID stored in the storage unit 31 through the LF communications of the LF transceiver 5b. If this judgment is YES, the ECU 3 causes the process to proceed to S29. If the judgment is NO, the ECU 3 causes the process to proceed to S23.

In step S29, the ECU 3 (the control unit 33) deploys the airbag jacket 1 by igniting the inflator 2, because the ECU 3 receives the ignition signal which is verified by use of the RF communications ID or the LF communications ID.

According to this embodiment, as described above, the airbag jacket activating system 100 uses both the RF band as the high-frequency band and the LF band as the low-frequency band. To put it more specifically, the motorcycle 20 is capable of transmitting the LF communications ID and the ignition signal to the airbag jacket 1 through the LF band, even in a case where the reliability in the radio communications using the RF band, which enables the RF communications ID to be coded, has degraded. Because this LF communications ID is updated at the predetermined timing, it is possible to prevent the LF communications ID from being decoded by a third party. Accordingly, no matter whether the airbag jacket activating system 100 uses the RF band or the LF band, the airbag jacket activating system 100 is capable of securing the confidentiality of the ID signal, and of activating the airbag jacket 1 with higher precision.

In addition, the airbag jacket activating system 100 gives priority to the radio communications using the RF band, which enables the encode and makes verification accuracy higher, over the radio communications using the LF band. For this reason, the airbag jacket activating system 100 is capable of enhancing the process efficiency while maintaining the operation accuracy.

Furthermore, the airbag jacket activating system 100 is capable of easily generating the LF communications ID by use of the RF communications ID, and of enhancing the confidentiality by adding the random number.

Hereinbelow, descriptions will be provided for a second embodiment of the present invention. Note that the configuration which is the same as that of the first embodiment will be denoted by the same reference numerals and descriptions for such configuration will be omitted or simplified.

In this embodiment, the radio communications means (the RF transceiver 5a, the LF transceiver 5b, the RF transceiver 24a and the LF transceiver 24b) in the first embodiment are also used as the radio communications means of the smart-key (keyless entry) system configured to transmit and receive the control signals for locking and unlocking the vehicle 20. Note that, in the smart-key (keyless entry) system, the verification of the airbag jacket 1 which the rider wears starts in response to the turning on of a knob switch (not illustrated) of the motorcycle 20 by the rider.

Both the storage unit 31 of the airbag jacket 1 and the storage unit 211 of the motorcycle 20 store a vehicle ID for indentifying the motorcycle 20 and a verification ID for identifying the airbag jacket 1. In addition, the vehicle ID may be the LF communications ID, and the verification ID may be the RF communications ID.

Figure 7:
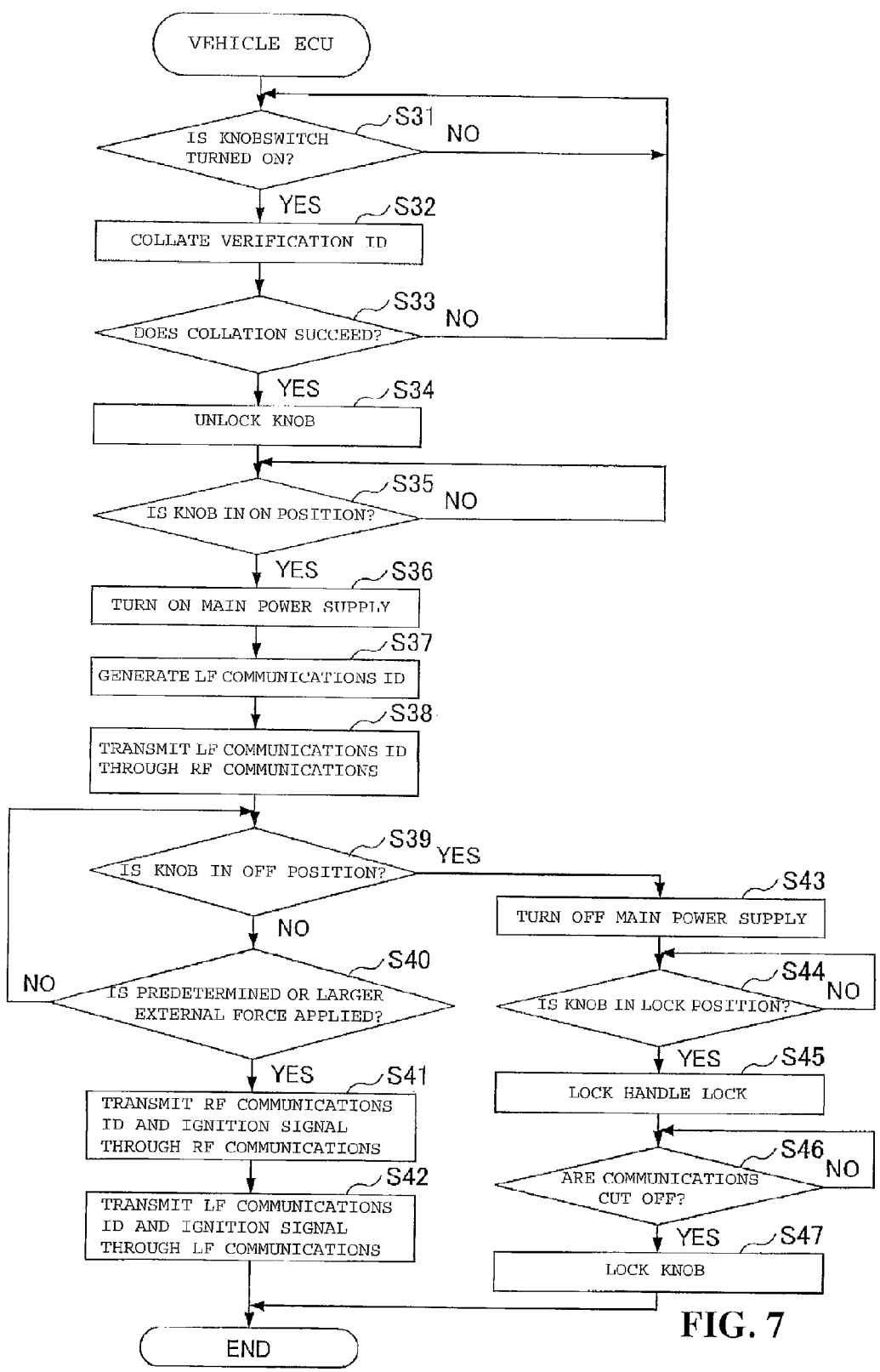
FIG. 7 is a flowchart showing a process of an ECU on a motorcycle according to a second embodiment.

FIG. 7 is a flowchart showing a process of the ECU 21 on the motorcycle according to this embodiment. The processing related to the alarming unit 214 in the first embodiment is omitted.

In step S31, the ECU 21 judges whether or not the knob switch of the motorcycle 20 is turned on. If this judgment is YES, the ECU 21 causes the process to proceed to step S32. If the judgment is NO, the ECU 31 continues with step S31.

In step S32, the ECU 21 transmits a request signal, which includes the vehicle ID, to the airbag jacket 1 through the LF communications of the LF transceiver 24b. Subsequently, the ECU 21 collates the verification ID, which is included in an answer signal transmitted from the airbag jacket 1 as a response to this request signal, with the ID which is stored in the storage unit 211.

In step S33, the ECU 21 judges whether or not the collation in the step S32 succeeds. If this judgment is YES, the ECU 21 causes the process to proceed to step S34. If the judgment is NO, the ECU 21 causes the process to return to step S31.

In step S34, the ECU 21 permits the knob to be unlocked, because the ECU 21 succeeds in verifying the smart-key (keyless entry) system.

In step S35, the ECU 21 judges whether or not the knob of the motorcycle is turned to an ON position. If this judgment is YES, the ECU 21 causes the process to proceed to step S36. If the judgment is NO, the ECU 21 continues with step S35.

In step S36, the ECU 21 judges that the rider performs an operation for turning on the power supply in step S35, and unlocks the handle lock, turning on the main power supply.

In step S37, the ECU 21 (the update unit 212) generates the LF communications ID on the basis of the RF communications ID which is stored in the storage unit 211.

In step S38, the ECU 21 (the update unit 212) the LF communications ID, which is generated in step S37, to the airbag jacket 1 through the RF communications of the RF transceiver 24a.

In step S39, the ECU 21 judges whether or not the knob of the motorcycle 20 is turned to an OFF position. If this judgment is YES, the ECU 21 causes the process to proceed to step S43. If the judgment is NO, the ECU 21 causes the process to proceed to step S40.

In step S40, the ECU 21 (the control unit 213) judges whether or not a predetermined or larger external force is applied on the basis of the acceleration detected by the acceleration sensor 23. If this judgment is YES, the ECU 21 causes the process to proceed to step S41. If the judgment is NO, the ECU 21 causes the process to return to step S39.

In step S41, the ECU 21 (the control unit 213) codes the RF communications ID and the ignition signal, and thereafter transmits them to the airbag jacket 1 through the RF communications of the RF transceiver 24a.

In step S42, the ECU 21 (the control unit 213) transmits the LF communications ID and the ignition signal to the airbag jacket 1 through the LF communications of the LF transceiver 24b.

In step S43, the ECU 21 judges that the rider performs an operation for turning off the power supply in step S39, and thus turns off the main power supply.

In step S44, the ECU 21 judges whether or not the knob of the motorcycle 20 is turned to the LOCK position. If this judgment is YES, the ECU 21 causes the process to proceed to S45. If the judgment is NO, the ECU 21 continues with step S44.

In step S45, the ECU 21 judges that the rider performs a locking operation in step S44, and thus locks the handle lock.

In step S46, the ECU 21 judges whether or not the communications with the airbag jacket 1 is cut off. If this judgment is YES, the ECU 21 causes the process to proceed to step S47. If the judgment is NO, the ECU 21 continues with step S46.

In step S47, the ECU 21 judges that the airbag jacket 1 is detached from the motorcycle 20 in step S44, or that the power supply of the airbag jacket is turned off, and locks the knob of the motorcycle 20.

Figure 8:
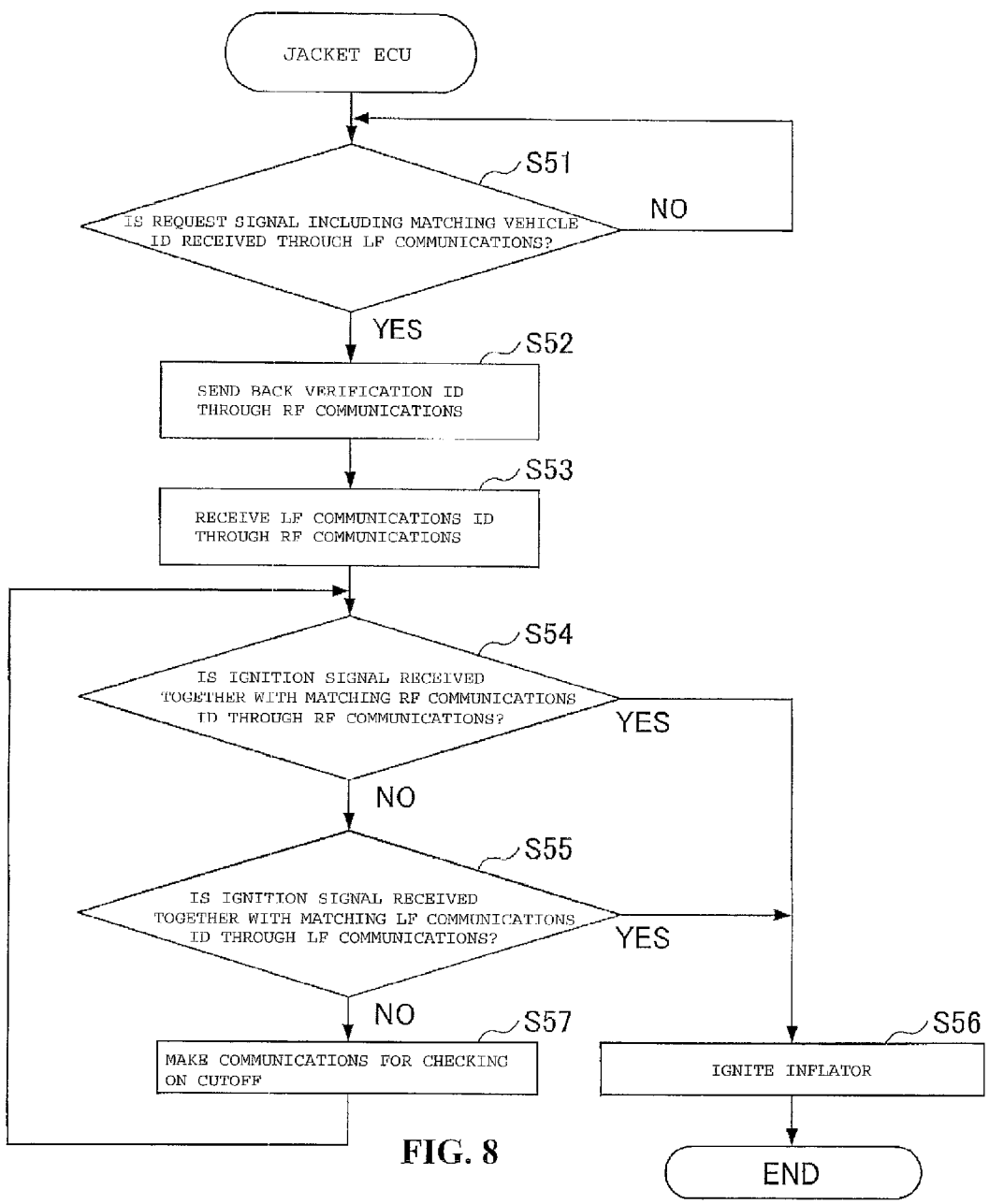
FIG. 8 is a flowchart showing a process of an ECU in an airbag jacket according to the second embodiment.

FIG. 8 is a flowchart showing a process of the ECU 3 in the airbag jacket 1 according to this embodiment. The processing related to the diagnosis unit 34 in the first embodiment is omitted.

In step S51, the ECU 3 judges whether or not the request signal which includes the vehicle ID matching the ID stored in the storage unit 31 is received from the motorcycle 20 through the LF transceiver 5b. If this judgment is YES, the ECU 3 causes the process to proceed to step S52. If the judgment is NO, the ECU 3 continues with step S51.

In step S52, the ECU 3 transmits the verification ID as a response to the motorcycle 20 through the RF communications of the RF transceiver 5a because the vehicle ID has been successfully collated. In addition, this verification ID may be transmitted after a predetermined coding process.

In step S53, the ECU 3 (the update unit 32) receives the LF communications ID, which is transmitted in step S28 (in FIG. 7), through the RF communications of the RF transceiver 5a. Subsequently, once the ECU 3 succeeds in collating the RF communications ID, the ECU 3 stores the LF communications ID in the storage unit 31.

In step S54, the ECU 3 (the control unit 33) judges whether or not the ignition signal is received together with the RF communications ID which matches the ID stored in the storage unit 31 through the RF communications of the RF transceiver 5a. If this judgment is YES, the ECU 3 causes the process to proceed to S56. If the judgment is NO, the ECU 3 causes the process to proceed to S55.

In step S55, the ECU 3 (the control unit 33) judges whether or not the ignition signal is received together with the LF communications ID which matches the ID stored in the storage unit 31 through the LF communications of the LF transceiver 5b. If this judgment is YES, the ECU 3 causes the process to proceed to S56. If the judgment is NO, the ECU 3 causes the process to proceed to S57.

In step S56, the ECU 3 (the control unit 33) deploys the airbag jacket 1 by igniting the inflator 2, because the ECU 3 has received the ignition signal which is verified by use of the RF communications ID or the LF communications ID.

In step S57, the ECU 3 transmits data, which indicates that the communications are ongoing, to the motorcycle 20 through the RF transceiver 5a or the LF transceiver 5b so that the cutoff can be checked in step S46 (in FIG. 7).

As described above, according to this embodiment, the airbag jacket activating system 100 can share the radio communications means with the smart-key (keyless entry) system. For this reason, the airbag jacket activating system 100 can be realized without providing any new specialized member to the existing system, and cost reduction can be accordingly achieved.

Hereinbelow, descriptions will be provided for a third embodiment of the present invention. Note that: the configuration which is the same as that of the first embodiment will be denoted by the same reference numerals; and descriptions for such configuration will be omitted or simplified.

With regard to the third embodiment, in the motorcycle 20, the control unit 213 transmits the same data through the RF transceiver 24a by use of multiple frequencies in the RF band. In addition, in the airbag jacket 1, the control unit 33 deploys the airbag when succeeding in the collation of the RF communications ID at a predetermined or higher rate over the multiple frequencies, more specifically, at the majority of the multiple frequencies and receives the ignition signal together. Hereinbelow, for the purpose of making the descriptions simple, let us assume that the multiple frequencies are three frequencies f1, f2, f3.

Figure 9:
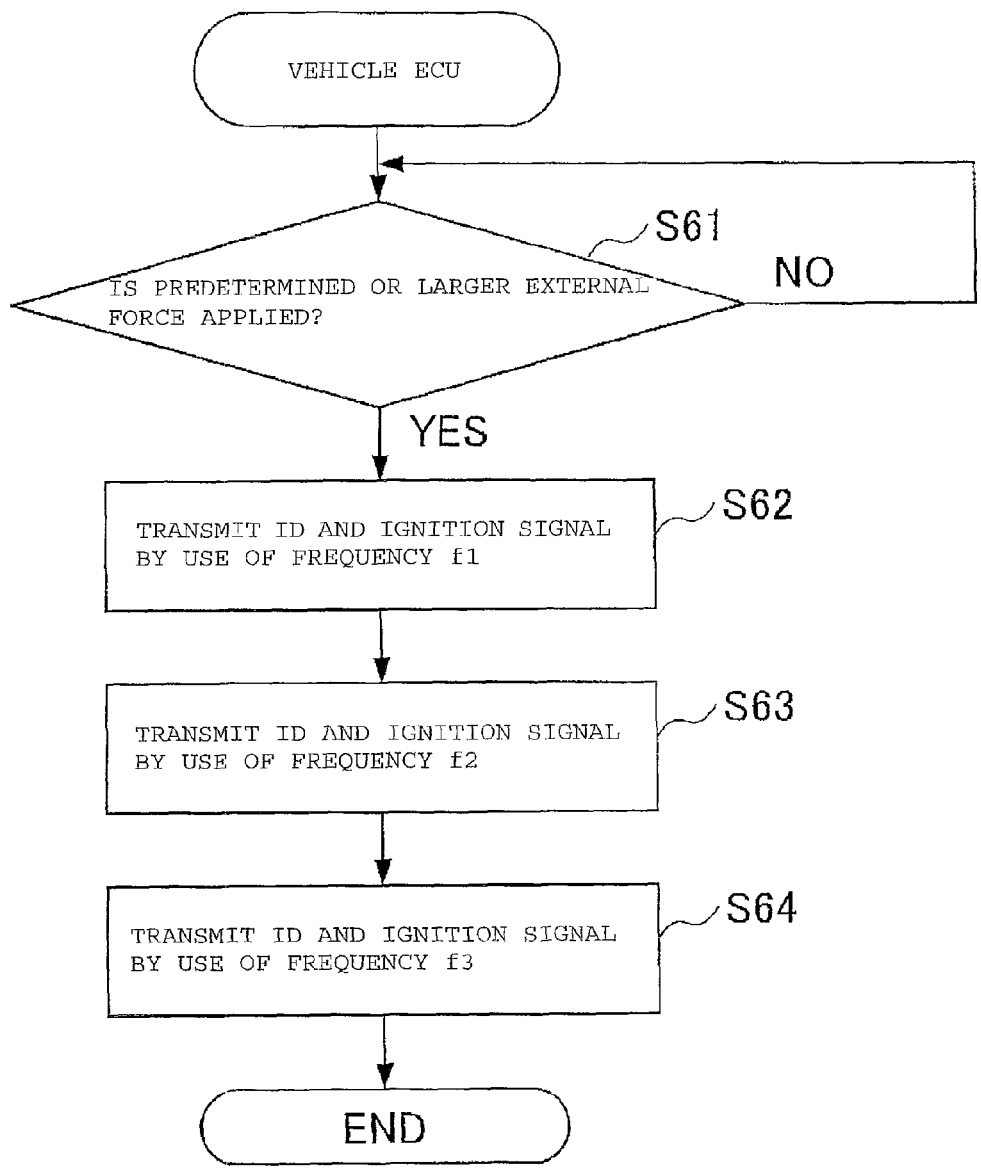
FIG. 9 is a flowchart showing a process of a control unit on a motorcycle according to the third embodiment.

FIG. 9 is a flowchart showing a process of the control unit 213 on the motorcycle 20 according to this embodiment. The processing through the LF communications of the LF transceiver 24b in the first embodiment is omitted.

In step S61, the control unit 213 judges whether or not a predetermined or larger external force is applied on the basis of the acceleration detected by the acceleration sensor 23. If this judgment is YES, the control unit 213 causes the process to proceed to step S62. If the judgment is NO, the control unit 213 continues with step S61.

In step S62, the control unit 213 codes the RF communications ID and the ignition signal, and thereafter transmits them to the airbag jacket 1 through the RF communications of the RF transceiver 24a by use of the frequency f1.

In step S63, the control unit 213 transmits the coded RF communications ID and the ignition signal to the airbag jacket 1 through the RF communications of the RF transceiver 24a by use of the frequency f2.

In step S64, the control unit 213 transmits the coded RF communications ID and the ignition signal to the airbag jacket 1 through the RF communications of the RF transceiver 24a by use of the frequency f3.

Figure 10:
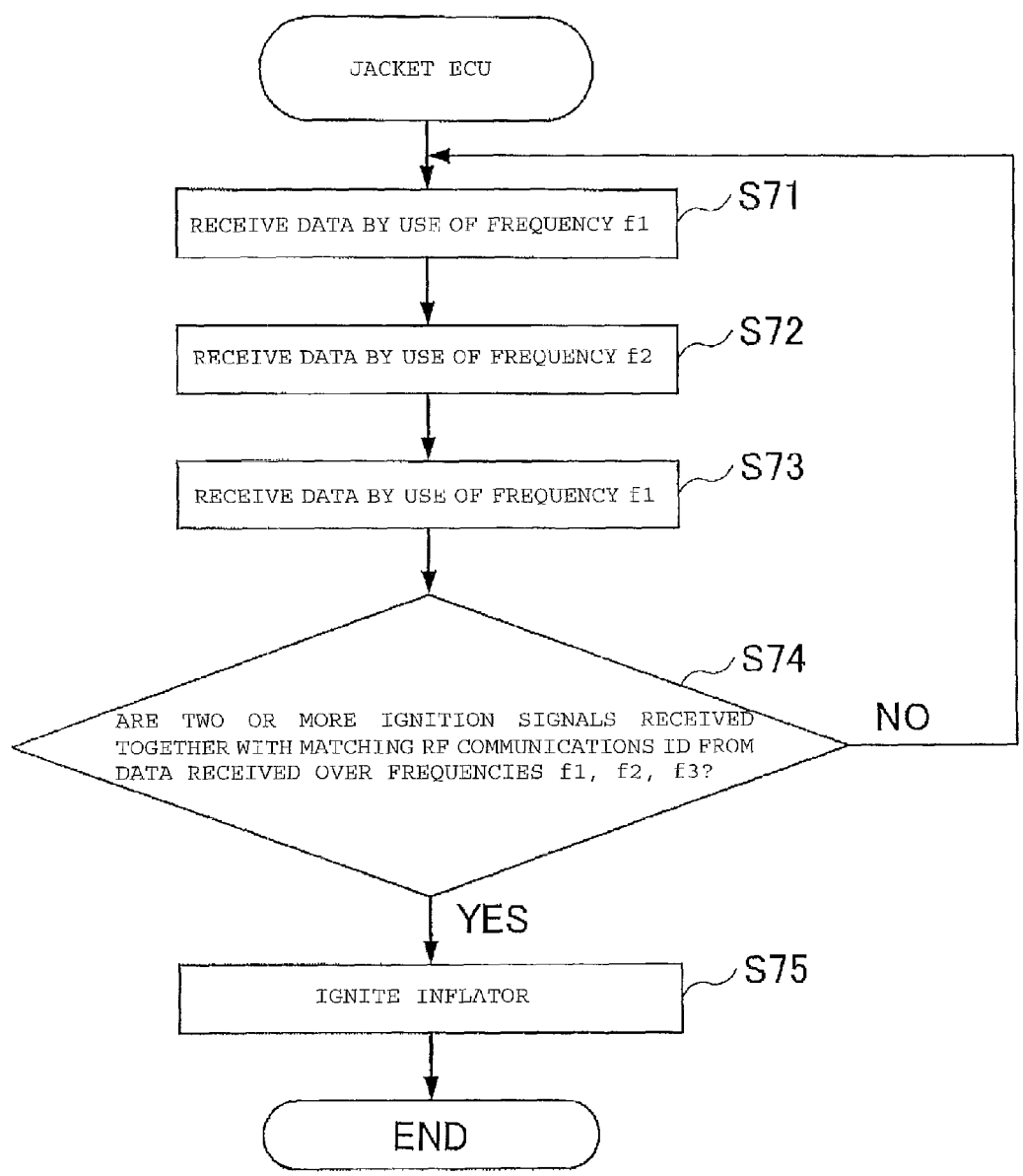
FIG. 10 is a flowchart showing a process of a control unit in an airbag jacket according to the third embodiment.

FIG. 10 is a flowchart showing a process of the control unit 33 in the airbag jacket 1 according to the third embodiment. The processing through LF communications of the LF transceiver 5b according to the first embodiment is omitted.

In step S71, the control unit 33 receives a piece of data, which is transmitted by use of the frequency f1, through the RF transceiver 5a.

In step S72, the control unit 33 receives a piece of data, which is transmitted by use of the frequency f2, through the RF transceiver 5a.

In step S73, the control unit 33 receives a piece of data, which is transmitted by use of the frequency f3, through the RF transceiver 5a.

In step S74, the control unit 33 decodes the three pieces of data transmitted by use of the respective frequencies f1, f2, f3, which are received in steps S71 to S73. In addition, the control unit 33 judges whether or not the RF communications ID, which matches the ID stored in the storage unit 31, and the ignition signal are received at two or more frequencies. If this judgment is YES, the ECU 3 causes the process to proceed to step S75. If the judgment is NO, the ECU 3 causes the process to return to step S71.

In step S75, the control unit 33 deploys the airbag jacket 1 by igniting the inflator 2, because the control unit 33 receives the ignition signal which is verified by the RF communications ID.

As described above, according to this embodiment, the airbag jacket 1 deploys in the case where the airbag jacket 1 receives the correct ID and the ignition signal are received at the predetermined or higher rate over (for example, the majority of) the multiple frequencies. Accordingly, the airbag jacket activating system 100 is capable of reducing the influence of noise, and of enhancing the reliability in the operation judgment on whether or not the airbag jacket activating system 100 should deploy the airbag jacket 1.

The foregoing descriptions have been provided the embodiments of the present invention. However, the present invention is not limited to the above-described embodiments. In addition, the effects described for each of the embodiments of the present invention are merely enumerated as the most preferable effects brought about by the present invention. The effects of the present invention are not limited to the effects described for each of the embodiments of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An airbag jacket activating system comprising:
radio communications means configured to make radio communications between a vehicle and an airbag jacket;
acceleration detecting means configured to detect acceleration of the vehicle;
on-vehicle control means configured to transmit deployment instruction data on the airbag jacket to the airbag jacket through the radio communications means in a case were the acceleration detected by the acceleration detecting means exceeds a predetermined value; and
in-jacket control means configured to deploy the airbag jacket when receiving the deployment instruction data transmitted from the on-vehicle control means;
wherein the radio communications means comprises:
high-frequency radio communications means configured to make radio communications by use of a high-frequency band; and
low-frequency radio communications means configured to make radio communications by use of a low-frequency band;
the vehicle further comprises:
on-vehicle storage means configured to store a high-frequency ID and a low-frequency ID; and
on-vehicle update means configured to update the low-frequency ID at a predetermined timing, to code the updated low-frequency ID together with the high-frequency ID, and to transmit the coded updated low-frequency ID and the coded high-frequency ID to the airbag jacket through the high-frequency radio communications means;
the airbag jacket further comprises:
in-jacket storage means configured to store the high-frequency ID and the low-frequency ID; and
in-jacket update means configured to collate the high-frequency ID transmitted from the on-vehicle update means with the high-frequency ID stored in the in-jacket storage means, and to store the updated low-frequency ID in the in-jacket storage means when receiving the updated low-frequency ID together with the high-frequency ID whose collation succeeds;

when the acceleration detected by the acceleration detecting means exceeds a predetermined value, the on-vehicle control means causes the coded high-frequency ID and the deployment instruction data to be transmitted through the high-frequency radio communications means, and causes the low-frequency ID and the deployment instruction data to be transmitted through the low-frequency radio communications means; and the in-jacket control means receives the deployment instruction data which is transmitted together with any one of the high-frequency ID and the low-frequency ID, and thus deploys the airbag jacket.

2. The airbag jacket activating system according to claim 1, wherein the in-jacket control means collates the high-frequency ID with the high-frequency ID stored in the in-jacket storage means preferentially over the low-frequency ID, and the in-jacket control means deploys the airbag jacket before collating the low-frequency IDs, when succeeding in the collation of the high-frequency IDs and receiving the deployment instruction data.

3. The airbag jacket activating system according to claim 1, wherein the on-vehicle update means generates the low-frequency ID by use of part of the high-frequency ID.

4. The airbag jacket activating system according to claim 2, wherein the on-vehicle update means generates the low-frequency ID by use of part of the high-frequency ID.

5. The airbag jacket activating system according to claim 3, wherein the on-vehicle update means generates the low-frequency ID by adding a random number to the part of the high-frequency ID.

6. The airbag jacket activating system according to claim 1, wherein the on-vehicle control means transmits a single piece of data through the high-frequency radio communications means by use of a plurality of frequencies in the high-frequency band, and the in-jacket control means deploys the airbag jacket when succeeding in the collation of the high-frequency ID at a predetermined or higher rate over the plurality of frequencies and receives the deployment instruction data.

7. The airbag jacket activating system according to claim 2, wherein the on-vehicle control means transmits a single piece of data through the high-frequency radio communications means by use of a plurality of frequencies in the high-frequency band, and the in-jacket control means deploys the airbag jacket when succeeding in the collation of the high-frequency ID at a predetermined or higher rate over the plurality of frequencies and receives the deployment instruction data.

8. The airbag jacket activating system according to claim 3, wherein the on-vehicle control means transmits a single piece of data through the high-frequency radio communications means by use of a plurality of frequencies in the high-frequency band, and the in-jacket control means deploys the airbag jacket when succeeding in the collation of the high-frequency ID at a predetermined or higher rate over the plurality of frequencies and receives the deployment instruction data.

9. The airbag jacket activating system according to claim 1, wherein the high-frequency radio communications means and the low-frequency radio communications means transmit and receive a control signal for locking or unlocking the vehicle.

10. The airbag jacket activating system according to claim 2, wherein the high-frequency radio communications means and the low-frequency radio communications means transmit and receive a control signal for locking or unlocking the vehicle.

11. An airbag jacket activating system adapted to be used with a vehicle and an airbag jacket comprising:

radio communications means adapted to send radio communications between a vehicle and an airbag jacket;

acceleration detecting means adapted to detect acceleration of a vehicle;

on-vehicle control means configured to transmit deployment instruction data on an airbag jacket to an airbag jacket through the radio communications means in a case were the acceleration detected by the acceleration detecting means exceeds a predetermined value; and in-jacket control means adapted to deploy an airbag jacket when receiving the deployment instruction data transmitted from the on-vehicle control means;

wherein the radio communications means comprises:

high-frequency radio communications means adapted make radio communications by use of a high-frequency band; and low-frequency radio communications means adapted to make radio communications by use of a low-frequency band;

on-vehicle storage means configured to store a high-frequency ID and a low-frequency ID; and on-vehicle update means configured to update the low-frequency ID at a predetermined timing, to code the updated low-frequency ID together with the high-frequency ID, and to transmit the coded updated low-frequency ID and the coded high-frequency ID to an airbag jacket through the high-frequency radio communications means;

in-jacket storage means configured to store the high-frequency ID and the low-frequency ID; and in-jacket update means configured to collate the high-frequency ID transmitted from the on-vehicle update means with the high-frequency ID stored in the in-jacket storage means, and to store the updated low-frequency ID in the in-jacket storage means when receiving the updated low-frequency ID together with the high-frequency ID whose collation succeeds;

when the acceleration detected by the acceleration detecting means exceeds a predetermined value, the on-vehicle control means causes the coded high-frequency ID and the deployment instruction data to be transmitted through the high-frequency radio communications means, and causes the low-frequency ID and the deployment instruction data to be transmitted through the low-frequency radio communications means; and the in-jacket control means receives the deployment instruction data which is transmitted together with any one of the high-frequency ID and the low-frequency ID, for deploying an airbag jacket.

12. The airbag jacket activating system adapted to be used with a vehicle and an airbag jacket according to claim 11, wherein the in-jacket control means collates the high-frequency ID with the high-frequency ID stored in the in-jacket storage means preferentially over the low-frequency ID, and the in-jacket control means deploys an airbag jacket before collating the low-frequency IDs, when succeeding in the collation of the high-frequency IDs and receiving the deployment instruction data.

13. The airbag jacket activating system adapted to be used with a vehicle and an airbag jacket according to claim 11, wherein the on-vehicle update means generates the low-frequency ID by use of part of the high-frequency ID.

14. The airbag jacket activating system adapted to be used with a vehicle and an airbag jacket according to claim 12, wherein the on-vehicle update means generates the low-frequency ID by use of part of the high-frequency ID.

15. The airbag jacket activating system adapted to be used with a vehicle and an airbag jacket according to claim 13, wherein the on-vehicle update means generates the low-frequency ID by adding a random number to the part of the high-frequency ID.

16. The airbag jacket activating system adapted to be used with a vehicle and an airbag jacket according to claim 11, wherein the on-vehicle control means transmits a single piece of data through the high-frequency radio communications means by use of a plurality of frequencies in the high-frequency band, and the in-jacket control means deploys the airbag jacket when succeeding in the collation of the high-frequency ID at a predetermined or higher rate over the plurality of frequencies and receives the deployment instruction data.

17. The airbag jacket activating system adapted to be used with a vehicle and an airbag jacket according to claim 12, wherein the on-vehicle control means transmits a single piece of data through the high-frequency radio communications means by use of a plurality of frequencies in the high-frequency band, and the in-jacket control means deploys the airbag jacket when succeeding in the collation of the high-frequency ID at a predetermined or higher rate over the plurality of frequencies and receives the deployment instruction data.

18. The airbag jacket activating system adapted to be used with a vehicle and an airbag jacket according to claim 13, wherein the on-vehicle control means transmits a single piece of data through the high-frequency radio communications means by use of a plurality of frequencies in the high-frequency band, and the in-jacket control means deploys the airbag jacket when succeeding in the collation of the high-frequency ID at a predetermined or higher rate over the plurality of frequencies and receives the deployment instruction data.

19. The airbag jacket activating system adapted to be used with a vehicle and an airbag jacket according to claim 11, wherein the high-frequency radio communications means and the low-frequency radio communications means transmit and receive a control signal for locking or unlocking the vehicle.

20. The airbag jacket activating system adapted to be used with a vehicle and an airbag jacket according to claim 12, wherein the high-frequency radio communications means and the low-frequency radio communications means transmit and receive a control signal for locking or unlocking the vehicle.

* * * * *